United States Patent [19]
Takano et al.

[11] Patent Number: 6,097,161
[45] Date of Patent: Aug. 1, 2000

[54] CHARGE PUMP TYPE BOOSTER CIRCUIT

[75] Inventors: Yoh Takano; Kouichi Yamada, both of Gifu-ken, Japan

[73] Assignee: Sanyo Electric Co., Ltd., Osaka, Japan

[21] Appl. No.: 09/288,306

[22] Filed: Apr. 8, 1999

[30] Foreign Application Priority Data

Apr. 10, 1998 [JP] Japan .................................. 10-099334
Feb. 1, 1999 [JP] Japan .................................. 11-024230

[51] Int. Cl.$^7$ .................................................. G05F 1/00
[52] U.S. Cl. ........................ 315/291; 315/307; 307/110; 327/536; 363/60
[58] Field of Search .................................... 315/291, 300, 315/302, 307, 360; 307/109, 110; 327/536, 306, 537, 589; 363/59, 60

[56] References Cited

U.S. PATENT DOCUMENTS

| | | | |
|---|---|---|---|
| 5,422,586 | 6/1995 | Tedrow et al. ........................ | 527/306 |
| 5,589,793 | 12/1996 | Kassapian ................................ | 327/536 |
| 5,650,671 | 7/1997 | Pascucci et al. ....................... | 307/110 |
| 5,701,096 | 12/1997 | Higshiho ................................ | 327/536 |
| 5,821,701 | 10/1998 | Teggatz et al. ......................... | 315/307 |
| 5,874,847 | 2/1999 | Kim et al. ................................ | 327/589 |
| 5,907,484 | 5/1999 | Kowshik et al. ........................ | 363/60 |
| 6,016,073 | 1/2000 | Ghilardelli et al. .................... | 327/536 |
| 6,037,622 | 3/2000 | Lin et al. ................................ | 307/110 |

*Primary Examiner*—Don Wong
*Assistant Examiner*—Thuy Vinh Tran
*Attorney, Agent, or Firm*—Armstrong, Westerman, Hattori, McLeland & Naughton

[57] ABSTRACT

In a charge pump type booster circuit, a capacitance coupling is performed between each capacitor of a charge pump series and each capacitor of another charge pump series by an equalizer, and a discharge current of the capacitors of one charge pump series is used as a charging current for the capacitors of the other charge pump series. Thereafter, each capacitor in each charge pump series is subjected to a generally high or low potential coupling by a driver circuit. As a result, the sum of charge/discharge currents of the capacitors in each charge pump series can be half as much as compared to when a single charge pump type booster circuit is provided. Even when a number n of stages of the charge pump series is increased, the power consumption can be reduced.

20 Claims, 8 Drawing Sheets

CHARGE PUMP TYPE BOOSTER CIRCUIT

FIELD OF THE INVENTION

The present invention relates to a charge pump type booster circuit.

BACKGROUND OF THE INVENTION

Recently, the range of potential applications for EEPROMs (Electrically Erasable and Programmable Read Only Memory) has been increased as manufacturers have begun using them as memory modules for storing programs or data in cellular phones, portable information terminals, and the like. Since a relatively high voltage of ten to twenty volts is required for writing and deleting the data in an EEPROM, it is necessary to use a charge pump type booster circuit to boost a power supply voltage (typically several volts) in a positive direction.

FIG. 5 shows a conventional charge pump type booster circuit for obtaining a higher potential booster voltage.

In the conventional, prior art circuit, a charge pump type booster circuit 21 is provided with a driver circuit 22, a charge pump series 23, and a control circuit 24.

The driver circuit 22 is provided with CMOS drivers 25, 26. The driver 25 comprises a PMOS transistor DP1 and an NMOS transistor DN1 connected in series between a power supply VDD (power supply voltage VDD) and a ground or reference potential. A control signal a-1 is transmitted to a gate of transistor DP1, while a control signal a-2 is transmitted to a gate of transistor DN1. Moreover, the driver 26 comprises a PMOS transistor DP2 and an NMOS transistor DN2 connected in series between the power supply VDD and ground. A control signal b-1 is transmitted to a gate of transistor DP2, while a control signal b-2 is transmitted to a gate of transistor DN2. Additionally, the control signals a-1, a-2, b-1, b-2 are generated by the control circuit 24.

The n stages (n being an integer) of the charge pump series 23 are provided with NMOS transistors T1 to Tn as n switching elements connected in series, n capacitors C1 to Cn, and NMOS transistors TD1 to TDn. Additionally, the m-th stage in the charge pump series 23 (m being an integer smaller than n) comprises NMOS transistor Tm and capacitor Cm, and a source of NMOS transistor Tm forms a node Nm. An output voltage HVOUT of the charge pump type booster circuit 21 is outputted via a drain of transistor Tn. Specifically, the drain of the transistor Tn serves as an output terminal of the charge pump type booster circuit 21.

Each of the capacitors C1 to Cn is embodied as a MOS capacitor formed of an NMOS transistor. A gate of each NMOS transistor forming one electrode of each of the capacitors C1 to Cn is connected to each of the nodes N1 to Nn. Moreover, for the capacitors C1 to Cn, a source and drain of each NMOS transistor forming the other electrode of each of the odd capacitors C1, C3 . . . C2m+1 are connected to a node 'b' between the transistors DP2 and DN2 of the driver 26, while a source and drain of each NMOS transistor forming the other electrode of each of the even capacitors C2, C4 . . . C2m are connected to a node 'a' between the transistors DP1 and DN1 of the driver 25.

The nodes N1 to Nn are connected to the gates of transistors T1 to Tn, respectively. The nodes N1 to Nn are connected to the power supply VDD via the transistors TD1 to TDn, and gates of transistors TD1 to TDn are also connected to the power supply VDD. Specifically, since the transistors T1 to Tn, TD1 to TDn are diode-connected, the sources of transistors T1 to Tn, TD1 to TDn serve as diode anodes, and the drains of transistors T1 to Tn, TD1 to TDn serve as diode cathodes.

Additionally, since a high voltage is applied to each of the NMOS transistors forming the transistors T1 to Tn, TD1 to TDn and the capacitors C1 to Cn, the NMOS transistors have high pressure resistant structures.

The operation of the prior art charge pump type booster circuit 21 will next be described.

FIG. 6 is a timing chart of the nodes 'a', 'b' and control signals a-1, a-2, b-1, b-2 in one cycle.

Each driver 25, 26 forming the driver circuit 22 is of a tri-state type. For a time t1 and a time t2, the control signal a-1 is at a high level, the control signal a-2 is at a low level, each transistor DP1, DN1 is turned off, and the node 'a' provides a high impedance. Moreover, for a time t3 and a time t4, the control signal b-1 is at a high level, the control signal b-2 is at a low level, each transistor DP2, DN2 is turned off, and the node 'b' provides a high impedance.

First, in an initial condition, each transistor DP1, DP2 is off, while each transistor DN1, DN2 is on. Each node 'a', 'b' is at the low level.

Subsequently, the control signal a-2 falls in order to turn off the transistor DN1, the control signal a-1 falls in order to turn on the transistor DP1, and the node 'a' rises in response. In this case, the even capacitors C2, C4 . . . C2m connected to the node 'a' are subjected to a positive coupling, and electric potentials of the even nodes N2, N4 . . . N2m are raised. Therefore, the even transistors T2, T4 . . . T2m are turned on, and a positive charge moves to the odd node N3, N5 . . . N2m+1, whose number advances by one from the even node N2, N4 . . . N2m.

After the control signal a-1 rises to turn off the transistor DP1, and the control signal a-2 rises to turn on the transistor DN1, the node 'a' falls. In this case, the even capacitors C2, C4 . . . C2m connected to the node 'a' are subjected to a negative coupling. Therefore, the electric potentials of even nodes N2, N4 . . . N2m are lowered.

Subsequently, the control signal b-2 falls in order to turn off the transistor DN2, the control signal b-1 falls in order to turn on the transistor DP2, and the node 'b' rises in response. In this case, the odd capacitors C1, C3 . . . C2m+1 connected to the node 'b' are subjected to the positive coupling, and the electric potentials of the odd nodes N1, N3 . . . N2m+1 are raised. Therefore, the odd transistors T1, T3 . . . T2m+1 are turned on, and the positive charge moves to the even node N2, N4 . . . N2m+2, whose number advances by one from the odd node N1, N3 . . . N2m+1.

After the control signal b-1 rises in order to turn off the transistor DP2, and the control signal b-2 rises in order to turn on the transistor DN2, the node 'b' falls in response. In this case, the odd capacitors C1, C3 . . . C2m+1 connected to the node 'b' are subjected to the negative coupling. Therefore, the electric potentials of the odd nodes N1, N3 . . . N2m+1 are lowered.

The aforementioned operation is repeatedly performed as one cycle.

When the coupling ratio of each of the capacitors C1 to Cn is and the threshold voltage of each of the transistors T1 to Tn and TD1 is Vt, the electric potentials of the nodes N2 to Nn are raised only by $\alpha VDD-Vt$ from the node less in number by one, i.e., N1 to Nn–1. Specifically, the voltage gain for each stage of the charge pump series 23 is $\alpha VDD-Vt$.

For example, the original potential of the node N1 is an electric potential VDD–Vt, which is obtained by subtracting the threshold voltage Vt of the transistor TD1 from the power supply voltage VDD. Therefore, the electric potential of the node N2 is $(\alpha+1)VDD-2Vt$, which is obtained by adding $\alpha VDD-Vt$ to the original potential $VDD-Vt$ of the node N1. Similarly, the electric potential of the node N3 is $(2\alpha+1)VDD-3Vt$, which is obtained by adding $\alpha VDD-Vt$ to the electric potential $(\alpha+1)VDD-2Vt$ of the node N2.

The charge pumping operation as described above sequentially moves the positive charge to the drain or output terminal of the transistor Tn from the power supply VDD in each stage of the charge pump series 23, and the electric potential is raised only by $\alpha VDD-Vt$ in each stage of the charge pump series 23. Therefore, a maximum value HVOUT(max) which can be reached by the output voltage HVOUT in the n stages of the charge pump series 23 is represented by following equation (1):

$$HVOUT(\max) = (n\alpha+1)VDD - (n+1)Vt \qquad (1)$$

Therefore, according to the charge pump type booster circuit 21, a desired positive potential output voltage HVOUT can be obtained by appropriately setting the number n of stages of the charge pump series 23.

Additionally, each of the transistors TD2 to TDn has a function of increasing the boosting rate, and further enhancing the boosting efficiency when $\alpha x VDD$ is small. Specifically, when the threshold voltage of each of the transistors TD2 to TDn is VT, the electric potential of each of the nodes N2 to Nn is initially VDD-VT by disposing the transistors TD2 to TDn as shown. On the other hand, when the transistors TD2 to TDn are omitted, the electric potential of each of the nodes N2 to Nn may be less than VDD-VT in the initial condition. Therefore, when the transistors TD2 to TDn are provided, the electric potentials of the nodes N2 to Nn can be made higher than VDD-VT after the boosting operation starts. Therefore, the transistors TD2 to TDn supply positive charges to the capacitors C1 to Cn.

When an EEPROM is erased, or "flashed", data in the entire memory cell array is deleted all at once, or the memory cell array is divided into arbitrary blocks, and the data deletion is performed in each block. The flash EEPROM is also called a flash memory, which can realize a large volume, low power consumption, and high-speed operation, and which is superior in shock resistance. Therefore, flash EEPROMs are ideal for use in various portable electronic apparatuses.

A certain type of flash EEPROM requires a negative potential for writing and deleting the data. In this type, the necessary negative potential is obtained by using the charge pump type booster circuit to boost the ground voltage (=0V) in a negative direction.

FIG. 7 shows a conventional charge pump type booster circuit for obtaining a negative booster voltage. In the charge pump type booster circuit shown in FIG. 7, elements the same as those in the charge pump type booster circuit 21 shown in FIG. 5 are denoted with the same reference characters, and a detailed description thereof is therefore omitted.

A charge pump type booster circuit 201 shown in FIG. 7 is different from the charge pump type booster circuit 21 shown in FIG. 5 in the following respects:

(a) Each of the transistors T1 to Tn, TD1 to TDn is formed of a PMOS transistor, instead of an NMOS transistor. Since a high voltage is applied to the PMOS transistor, the transistor has a high pressure resistant structure.

(b) Each of the capacitors C1 to Cn is embodied as a MOS capacitor formed by a PMOS transistor, instead of a MOS capacitor formed by an NMOS transistor.

(c) Each of the nodes N1 to Nn is connected to the ground via each of the PMOS transistors TD1 to TDn, and the gates of the PMOS transistors TD1 to TDn are also connected to the ground.

The operation of the charge pump type booster circuit 201 will next be described.

FIG. 8 is a timing chart of the nodes 'a', 'b' and control signals a-1, a-2, b-1, b-2 in one cycle.

First, in the initial condition, each transistor DP1, DP2 is off, while each transistor DN1, DN2 is on. Each node 'a', 'b' is at a high level.

Subsequently, the control signal a-1 rises in order to turn off the transistor DP1, the control signal a-2 rises in order to turn on the transistor DN1, and the node 'a' falls in response. In this case, the even capacitors C2, C4 . . . C2m connected to the node 'a' are subjected to the negative coupling, and the electric potentials of the even nodes N2, N4 . . . N2m are lowered. Therefore, the even transistors T2, T4 . . . T2m are turned on, and a negative charge moves to the odd node N3, N5 . . . N2m+1, whose number advances by one from the even nodes N2, N4 . . . N2m.

After the control signal a-2 falls in order to turn off the transistor DN1, and the control signal a-1 falls in order to turn on the transistor DP1, the node 'a' rises. In this case, the even capacitors C2, C4 . . . C2m connected to the node 'a' are subjected to the positive coupling. Therefore, the electric potentials of the even nodes N2, N4 . . . N2m are raised.

Subsequently, the control signal b-1 rises in order to turn off the transistor DP2, the control signal b-2 rises in order to turn on the transistor DN2, and the node 'b' falls in response. In this case, the odd capacitors C1, C3 . . . C2m+1 connected to the node 'b' are subjected to the negative coupling, and the electric potentials of the odd nodes N1, N3 . . . N2m+1 are lowered. Therefore, the odd transistors T1, T3 . . . T2m+1 are turned on, and the negative charge moves to the even nodes N2, N4 . . . N2m+2, whose number advances by one from the odd nodes N1, N3 . . . N2m+1.

After the control signal b-2 falls in order to turn off the transistor DN2, and the control signal b-1 falls in order to turn on the transistor DP2, the node 'b' rises. In this case, the odd capacitors C1, C3 . . . C2m+1 connected to the node 'b' are subjected to the positive coupling. Therefore, the electric potentials of the odd nodes N1, N3 . . . N2m+1 are raised.

When the aforementioned operation is repeatedly performed as one cycle, the electric potential of each of the nodes N2 to Nn is varied only by $-\alpha VDD+Vt$ from the electric potential of the previous node, i.e., N1 to Nn−1. Specifically, the voltage gain for each stage of the charge pump series 23 is $-\alpha VDD+Vt$.

For example, the original potential of the node N1 is an electric potential 0V+Vt, which is obtained by adding the threshold voltage Vt of the transistor TD1 to the ground potential. Therefore, the electric potential of the node N2 is $-\alpha VDD+2Vt$, which is a change of $-\alpha VDD+Vt$ from the original potential 0V+Vt of the node N1. Similarly, the electric potential of the node N3 is $-2\alpha VDD+3Vt$, which is a change of $-\alpha VDD+Vt$ from the electric potential $-\alpha VDD+2Vt$ of the node N2.

The charge pumping operation as described above sequentially moves the negative charge to the drain or output terminal of the transistor Tn from the power supply VDD in each stage of the charge pump series 23, and the electric potential is lowered only by $-\alpha VDD+Vt$ in each stage of the charge pump series 23. Therefore, the maximum value HVOUT(max) which can be reached by the output voltage HVOUT in the n stages of the charge pump series 23 is represented by following equation (2):

$$HVOUT(\max) = -n\alpha VDD + (n+1)Vt \qquad (2)$$

Therefore, according to the charge pump type booster circuit 201, a desired negative output voltage HVOUT can be obtained by appropriately setting the number n of stages of the charge pump series 23.

Additionally, each of the transistors TD2 to TDn has a function of increasing the boosting rate, and further enhancing the boosting efficiency when $\alpha \times VDD$ is small. Specifically, when the threshold voltage of each of the transistors TD2 to TDn is VT, by disposing the transistors TD2 to TDn as shown, the initial electric potential of each of the nodes N2 to Nn is VT. On the other hand, when the transistors TD2 to TDn are omitted, the electric potential of each of the nodes N2 to Nn may initially become higher than VT. Therefore, when the transistors TD2 to TDn are provided, the electric potential of each of the nodes N2 to Nn can be made lower than VT after the boosting operation starts. Therefore, the transistors TD2 to TDn supply negative charge to the capacitors C1 to Cn.

The power supply voltage VDD has heretofore generally been 5V, but recently it has been required to be lowered to 3.3V. Accordingly, in the charge pump type booster circuit 21 for obtaining a positive booster voltage, the number n of stages of the charge pump series 23 have been increased in order to obtain the necessary output voltage HVOUT from the low power supply voltage VDD.

Moreover, in the charge pump type booster circuit 201 for obtaining a negative booster voltage, the number n of stages of the charge pump series 23 also have to be increased in order to obtain a low negative potential.

In the prior art charge pump type booster circuit 21 or 201, when the number n of stages of the charge pump series 23 are increased, the charge/discharge currents of the capacitors C2 to Cn are increased. Therefore, a problem results in that the power consumption of the charge pump type booster circuit is enlarged.

SUMMARY OF THE INVENTION

Wherefore, an object of the present invention is to provide a booster circuit which can realize a low power consumption.

To attain this and other objects, a charge pump type booster circuit is provided comprising a charge pump series in which a capacitor and a switching element for transferring an electric charge of the capacitor to the next stage are connected in series in a plurality of stages. The charge pump series includes a first capacitor group and a second capacitor group. The circuit is also provided with a first driver for applying a coupling to each capacitor of the first capacitor group, a second driver for applying the coupling to each capacitor of the second capacitor group, an equalizer for performing the capacitance coupling between the first capacitor group and the second capacitor group, and a controller for controlling operations of the drivers and the equalizer. When the first capacitor group has a first electric potential, and the second capacitor group has a second electric potential lower than the first electric potential, the controller allows the equalizer to perform the capacitance coupling, charges the second capacitor group with a resulting discharge current of the first capacitor group, applies the coupling by the first driver, and applies the coupling by the second driver.

Therefore, according to the present invention, the discharge current of the first capacitor group is used as a charge current of the second capacitor group without wasting or discarding the discharge current. The charge/discharge current of each capacitor can be reduced, and the power consumption can be lowered.

In another aspect of the present invention, a charge pump type booster circuit is provided comprising a first charge pump series in which a capacitor and a switching element for transferring an electric charge of the capacitor to the next stage are connected in series in a plurality of stages, a second charge pump series in which the capacitor and the switching element for transferring the electric charge of the capacitor to the next stage are connected in series in a plurality of stages, a first driver for applying a coupling to each capacitor of the first charge pump series, a second driver for applying the coupling to each capacitor of the second charge pump series, an equalizer for performing the capacitance coupling between the each capacitor of the first charge pump series and each capacitor of the second charge pump series, and a controller for controlling operations of the driver and the equalizer. In the circuit, when each capacitor of the first charge pump series has a first electric potential, and each capacitor of the second charge pump series has a second electric potential lower than the first electric potential, the controller allows the equalizer to perform the capacitance coupling, charges each capacitor of the second charge pump series with a resulting discharge current of each capacitor of the first charge pump series, applies the coupling by the first driver, and applies the coupling by the second driver.

Therefore, according to the present invention, the discharge current of each capacitor of the first charge pump series is used as a charge current of each capacitor of the second charge pump series without wasting or discarding the discharge current. The charge/discharge current of each capacitor can be reduced, and the power consumption can be lowered.

In the charge pump type booster circuit of the present invention, the charge pump series may be connected to a power supply, and the driver may apply the coupling to move a positive electric charge to an output terminal of the charge pump series opposite the power supply via the switching element, so that an electric potential of the output terminal of the charge pump series is raised above a power supply electric potential. In this case, the charge pump type booster circuit may further be provided with an electric charge supply unit for supplying a positive electric charge to each capacitor of the charge pump series. As a result, since the positive electric charge is initially supplied to each capacitor, the boosting rate can be increased. Additionally, even when the coupling ratio of each capacitor or the power supply voltage is low, the boosting efficiency can be enhanced.

Moreover, the charge pump type booster circuit of the present invention may be configured to provide a negative output booster voltage.

Furthermore, in the charge pump type booster circuit, the application of the coupling by the first driver and the application of the coupling by the second driver may be performed non-simultaneously. As a result, since the peak values of each charge/discharge current and output current of the first capacitor group (first charge pump series) or the second capacitor group (second charge pump series) are deviated, the output voltage of the charge pump type booster circuit can be stabilized.

BRIEF DESCRIPTION OF THE DRAWINGS

Preferred embodiments of the present invention will be described with reference to the drawings, in which.

DETAILED DESCRIPTION OF PREFERRED EMBODIMENTS

Figure 5:
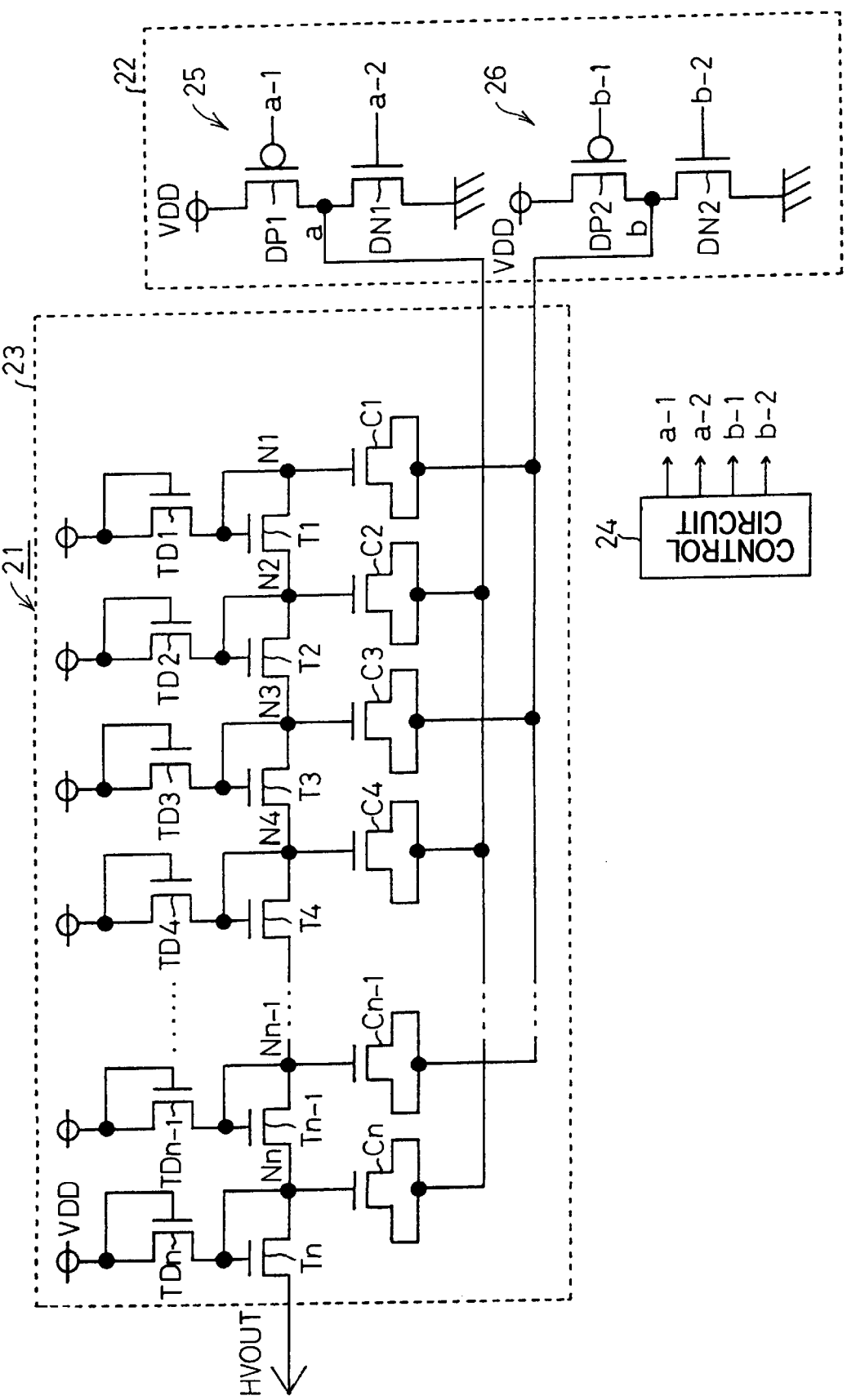
FIG. 5 is a circuit diagram of a prior art charge pump type booster circuit for obtaining a positive booster voltage.
Figure 6:
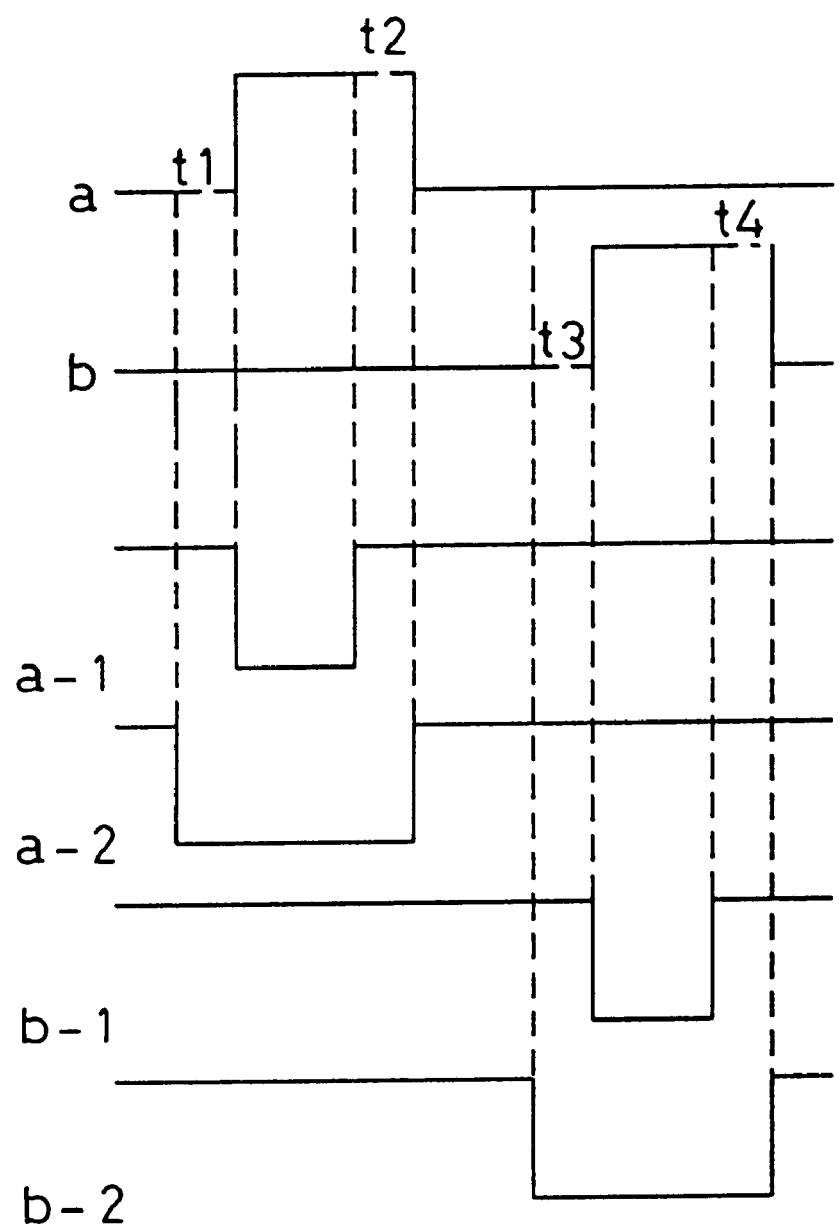
FIG. 6 is a timing chart showing the operation of the charge pump type booster circuit shown in FIG. 5.

In the first embodiment of the present invention, elements that are the same as those of the conventional circuit shown in FIG. 5 are given the same reference characters, and a detailed description thereof is therefore omitted.

Figure 1:
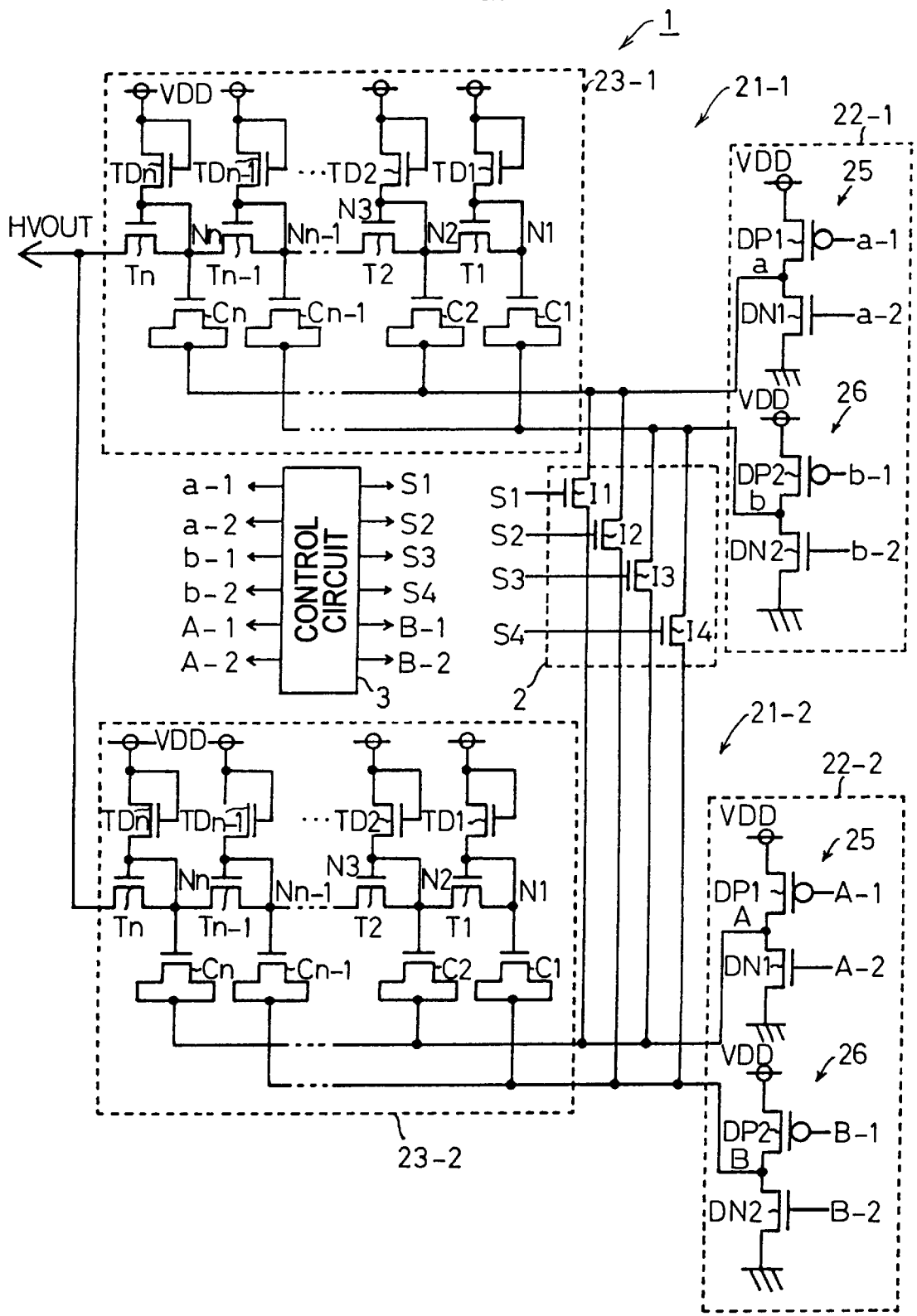
FIG. 1 is a circuit diagram of a first embodiment of the present invention.

Referring to FIG. 1, a charge pump type booster circuit 1 for obtaining a positive booster voltage is provided with two charge pump type booster circuits 21-1, 21-2. The circuit 1 is further provided with an equalizer 2, and a control circuit 3.

The charge pump type booster circuit 21-1 comprises a first driver circuit 22-1 and a first charge pump series 23-1, while the charge pump type booster circuit 21-2 comprises a second driver circuit 22-2 and a second charge pump series 23-2.

Furthermore, the nodes of the second driver 22-2 are designated A and B so as to distinguish them from the nodes 'a', 'b' of the first driver 22-1. The control signals provided to the second driver 22-2 are designated A-1, A-2, B-1, B-2 so as to distinguish them from the control signals a-1, a-2, b-1, b-2 of the first driver 22-1.

The equalizer 2 is provided with an NMOS transistor I1 for connecting the nodes 'a' and A, an NMOS transistor I2 for connecting the nodes 'a' and B, an NMOS transistor I3 for connecting the nodes 'b' and A, and an NMOS transistor I4 for connecting the nodes 'b' and B. Control signals S1 to S4 are transmitted to gates of transistors I1 to I4, respectively.

The control circuit 3 generates the control signals a-1, a-2, b-1, b-2, A-1, A-2, B-1, B-2, and S1 to S4.

A drain of transistor Tn of charge pump series 23-1 is connected to a drain of transistor Tn of charge pump series 23-2, and the output voltage HVOUT of the charge pump type booster circuit 1 is outputted via these drains. Specifically, each drain of the transistors Tn of the charge pump series 23-1, 23-2 serves as an output terminal of the charge pump type booster circuit 1. Additionally, since the principle of positively boosting the power source voltage VDD is the same as that in the charge pump type booster circuit 21, a description thereof is omitted.

The operation of the charge pump type booster circuit 1 will next be described.

Figure 2:
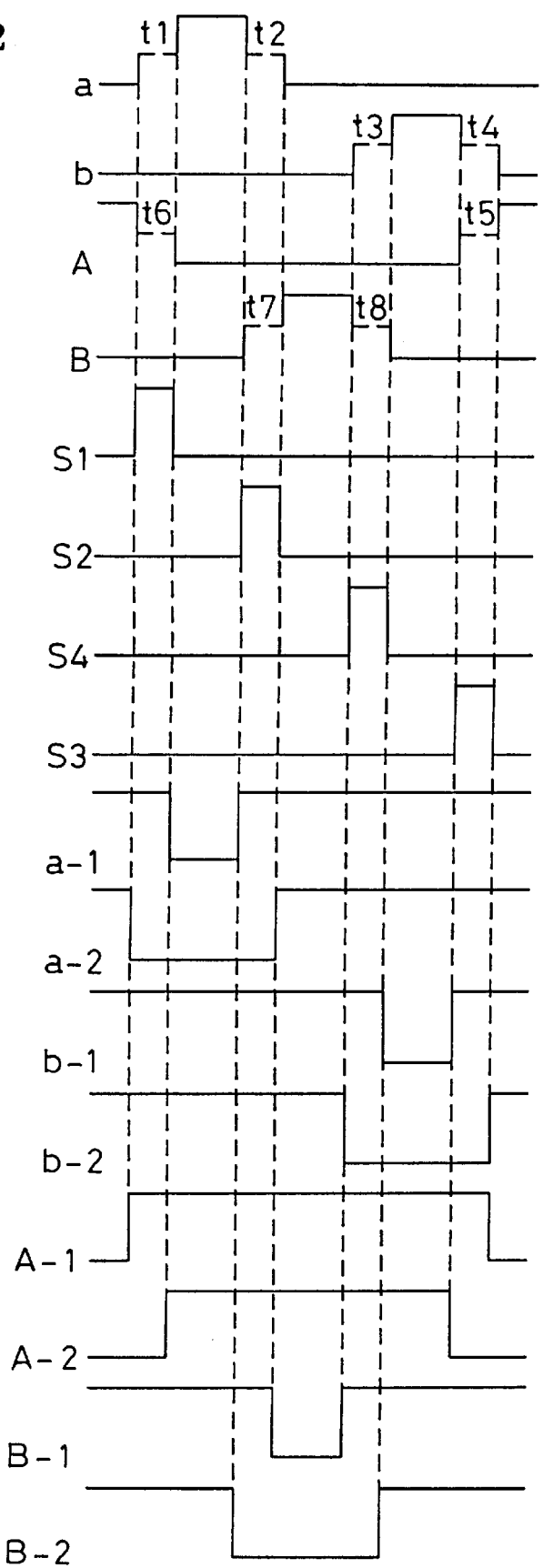
FIG. 2 is a timing chart showing an operation according to the first embodiment.

FIG. 2 is a timing chart showing the nodes 'a', 'b' and control signals a-1, a-2, b-1, b-2 in one cycle, and the corresponding nodes A, B and control signals A-1, A-2, B-1, B-2, and S1 to S4.

For the timing, each of the nodes A, B and the control signals A-1, A-2, B-1, B-2 advances by 90° from each of the nodes 'a', 'b' and control signals a-1, a-2, b-1, b-2.

Therefore, when the control signal a-2 falls, the control signal A-1 rises. When the control signal a-1 falls, the control signal A-2 rises. When the control signal a-1 rises, the control signal B-2 falls. When the control signal a-2 rises, the control signal B-1 falls. When the control signal b-2 falls, the control signal B-1 rises. When the control signal b-1 falls, the control signal B-2 rises. When the control signal b-1 rises, the control signal A-2 falls. When the control signal b-2 rises, the control signal A-1 falls.

Each driver 25, 26 forming the drivers 22-1, 22-2 is of a tri-state type.

For a time t1, t2, the control signal a-1 is at a high level, the control signal a-2 is at a low level, each transistor DP1, DN1 of the driver 22-1 is turned off, and the node 'a' provides a high impedance. Moreover, for a time t3, t4, the control signal b-1 is at a high level, the control signal b-2 is at a low level, each transistor DP2, DN2 of the driver 22-1 is turned off, and the node 'b' provides a high impedance.

Similarly, for a time t5, t6, the control signal A-1 is at a high level, the control signal A-2 is at a low level, each transistor DP1, DN1 of the driver 22-2 is turned off, and the node 'a' provides a high impedance. Moreover, for a time t7, t8, the control signal B-1 is at a high level, the control signal B-2 is at a low level, each transistor DP2, DN2 of the driver 22-2 is turned off, and the node B provides a high impedance.

Since the timing of the control signal A-1, A-2, B-1, or B-2 advances by 90° from that of the control signal a-1, a-2, b-1, or b-2, the times t1 and t6, t2 and t7, t3 and t8, or t4 and t5 coincide with each other.

Since the control signal S1 reaches the high level in order to turn on the transistor I1 for the time t1 (from when the control signal a-2 falls until the control signal a-1 falls) or for the time t6 (from when the control signal A-1 rises until the control signal A-2 rises), the nodes 'a' and A are connected.

Therefore, the even capacitors C2, C4 ... C2m of the charge pump series 23-1 connected to the node 'a' and the even capacitors C2, C4 ... C2m of the charge pump series 23-2 connected to the node A are connected via the transistor I1 having turned on. As a result, the electric charges accumulated in the capacitors connected to the node A are moved and accumulated into the capacitors connected to the node 'a' via the transistor I1 having turned on. Additionally, when the time t1, t6 elapses, the node 'a' reaches the high level, and the node A reaches the low level, each capacitor connected to the node 'a' is subjected to the positive coupling, and each capacitor connected to the node A is subjected to the negative coupling.

To facilitate the description of the embodiments, the term "positive coupling" or "negative coupling" is used. As apparent from the description of the operation of each embodiment, these terms do not necessarily mean the plus or minus electric potential. The coupling with a relatively high electric potential is simply called the positive coupling, while the coupling with a relatively low electric potential is simply called the negative coupling.

Furthermore, since the control signal S2 reaches the high level in order to turn on the transistor I2 for the time t2 (from when the control signal a-1 rises until the control signal a-2 rises) or for the time t7 (from when the control signal B-2 falls until the control signal B-1 falls), the nodes 'a' and B are connected.

Therefore, the even capacitors C2, C4 ... C2m of the charge pump series 23-1 connected to the node 'a' and the odd capacitors C1, C3 ... C2m+1 of the charge pump series 23-2 connected to the node B are connected via the transistor I2 having turned on. As a result, the electric charges accumulated in the capacitors connected to the node 'a' are moved and accumulated into the capacitors connected to the node B via the transistor I2 having turned on. Additionally, when the time t2, t7 elapses, the node B reaches the high level, and the node 'a' reaches the low level, each capacitor connected to the node B is subjected to the positive coupling, while each capacitor connected to the node 'a' is subjected to the negative coupling.

Similarly, since the control signal S4 reaches the high level in order to turn on the transistor I4 for the time t3 (from when the control signal b-2 falls until the control signal b-1 falls) or for the time t8 (from when the control signal B-1 rises until the control signal B-2 rises), the nodes 'b' and B are connected.

Therefore, the odd capacitors C1, C3 ... C2m+1 of the charge pump series 23-1 connected to the node 'b' and the odd capacitors C1, C3 ... C2m+1 of the charge pump series 23-2 connected to the node B are connected via the transistor I4 having turned on. As a result, the electric charges accumulated in the capacitors connected to the node B are moved and accumulated into the capacitors connected to the node 'b' via the transistor I4 having turned on. Additionally, when the time t3, t8 elapses, the node 'b' reaches the high level, and the node B reaches the low level, each capacitor connected to the node 'b' is subjected to the positive coupling, while each capacitor connected to the node B is subjected to the negative coupling.

Moreover, since the control signal S3 reaches the high level in order to turn on the transistor I3 for the time t4 (from when the control signal b-1 rises until the control signal b-2 rises) or for the time t5 (from when the control signal A-2 falls until the control signal A-1 falls), the nodes 'b' and A are connected.

Therefore, the odd capacitors C1, C3 ... C2m+1 of the charge pump series 23-1 connected to the node 'b' and the even capacitors C2, C4 ... C2m of the charge pump series 23-2 connected to the node A are connected via the transistor I3 having turned on. As a result, the electric charges accumulated in the capacitors connected to the node 'b' are moved and accumulated into the capacitors connected to the node A via the transistor I3 having turned on. Additionally, when the time t4, t5 elapses, the node A reaches the high level, and the node 'b' reaches the low level, each capacitor connected to the node A is subjected to the positive coupling, while each capacitor connected to the node 'b' is subjected to the negative coupling.

As described above, in the timing chart of FIG. 2, first the capacitors connected to the node 'a' are charged with the discharge current of the capacitors connected to the node A. Subsequently, the capacitors connected to the node B are charged with the discharge current of the capacitors connected to the node 'a'. The capacitors connected to the node 'b' are charged with the discharge current of the capacitors connected to the node B. Then, the capacitors connected to the node A are charged with the discharge current of the capacitors connected to the node 'b'. This operation is repeatedly performed.

As described above in detail, in the first embodiment, the nodes 'a', 'b', A, B are operated by the drivers 22-1, 22-2 to reach the high level. Each capacitor connected to the node having reached the high level is subjected to the positive coupling. Moreover, the nodes 'a', 'b', A, B are operated by the drivers 22-1, 22-2 to reach the low level, and each capacitor connected to the node of the low level is subjected to the negative coupling. Additionally, the transistors I1 to I4 of the equalizer 2 are turned on for the time t1 to t8 while the nodes 'a', 'b', A, B provide the high impedance, before the nodes 'a', 'b', A, B are operated to the high level or the low level by the drivers 22-1, 22-2. Therefore, each capacitor of the charge pump series 23-1 and each capacitor of the charge pump series 23-2 are equalized by the capacitance coupling via the transistors I1 to I4 having turned on. As a result, each capacitor next subjected to the positive coupling is charged with the discharge current of each capacitor next subjected to the negative coupling.

Specifically, in the first embodiment, after the capacitance coupling is performed between each capacitor of the charge pump series 23-1 and each capacitor of the charge pump series 23-2 by the equalizer 2, each capacitor in the charge pump series 23-1, 23-2 is subjected to the coupling by the drivers 22-1, 22-2.

On the other hand, in the conventional charge pump type booster circuit 21, each capacitor in the charge pump series 23 is subjected to the coupling by the driver 22. Subsequently, the discharge currents of the even capacitors C2, C4 ... C2m flow to the ground from the node 'a' via the transistor DN1, while the discharge currents of the odd capacitors C1, C3 ... C2m+1 flow to the ground from the node 'b' via the transistor DN2. Specifically, in the conventional charge pump type booster circuit 21, the discharge currents of the capacitors C1 to Cn are wastefully discharged to the ground.

In the first embodiment, however, since the two charge pump series 23-1, 23-2 and the equalizer 2 are provided, the discharge currents of the capacitors of the charge pump series, which are discarded in the conventional charge pump type booster circuit 21, are effectively used to charge the capacitors of the other charge pump series.

Therefore, according to the charge pump type booster circuit 1 of the first embodiment, the sum of the charge/discharge currents of the capacitors connected to each charge pump series 23-1, 23-2 can be the half of the sum in the conventional charge pump type booster circuit 21. Therefore, according to the first embodiment, even when the number of stages n of each charge pump series 23-1, 23-2 is increased for a low power supply voltage VDD, the increase of charge/discharge currents of the capacitors C1 to Cn can be suppressed, and the power consumption can thus be reduced.

Moreover, as apparent from FIG. 2, the phases of the nodes 'a' and A deviate from each other by 90°, while the phases of the nodes 'b' and B deviate from each other by 90°. Therefore, since the peak values of charge/discharge currents and output currents from the output terminal or drain of transistor Tn of each charge pump series 23-1, 23-2 are out of phase by 90°, the output voltage HVOUT can be stabilized.

A second embodiment of the present invention will next be described with reference to FIG. 3. Additionally, in the second embodiment, any elements that are the same as those in the conventional circuit of FIG. 7 and the first embodiment of FIG. 1 are given the same reference characters, and a detailed description thereof is therefore omitted.

Figure 3:
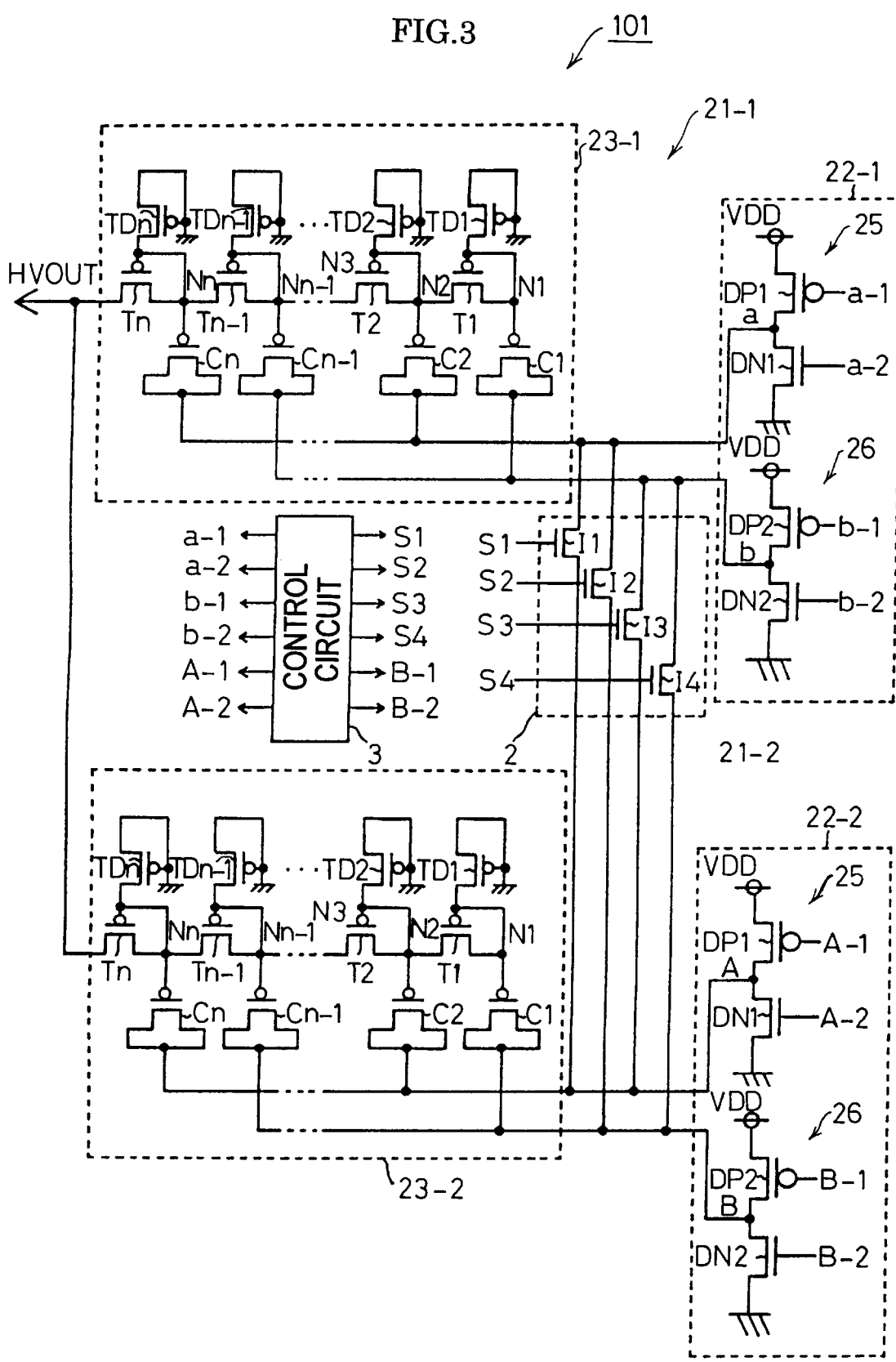
FIG. 3 is a circuit diagram of a second embodiment of the present invention.

FIG. 3 shows the charge pump type booster circuit of the second embodiment.

Figure 7:
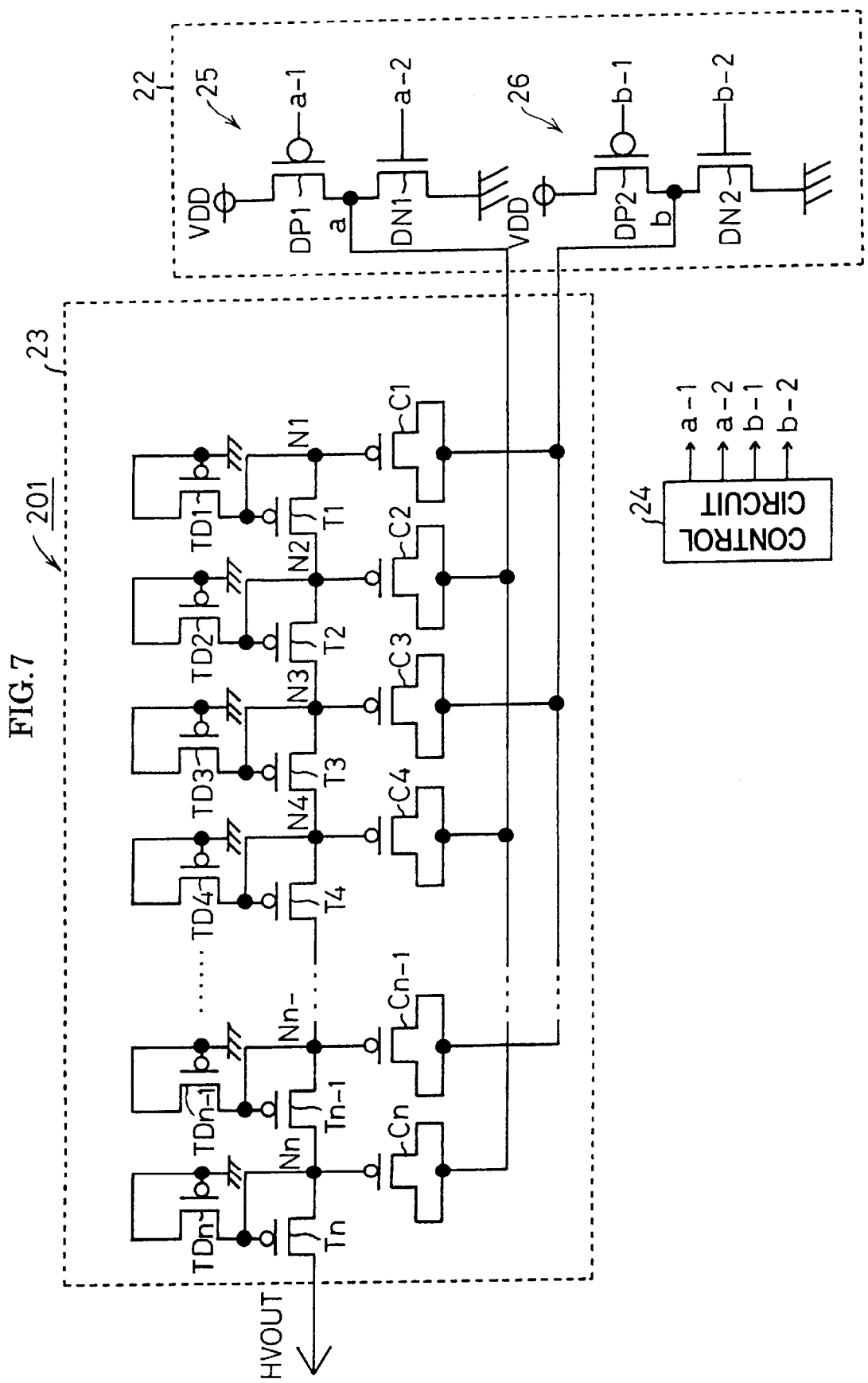
FIG. 7 is a circuit diagram of a prior art charge pump type booster circuit for obtaining a negative booster voltage.
Figure 8:
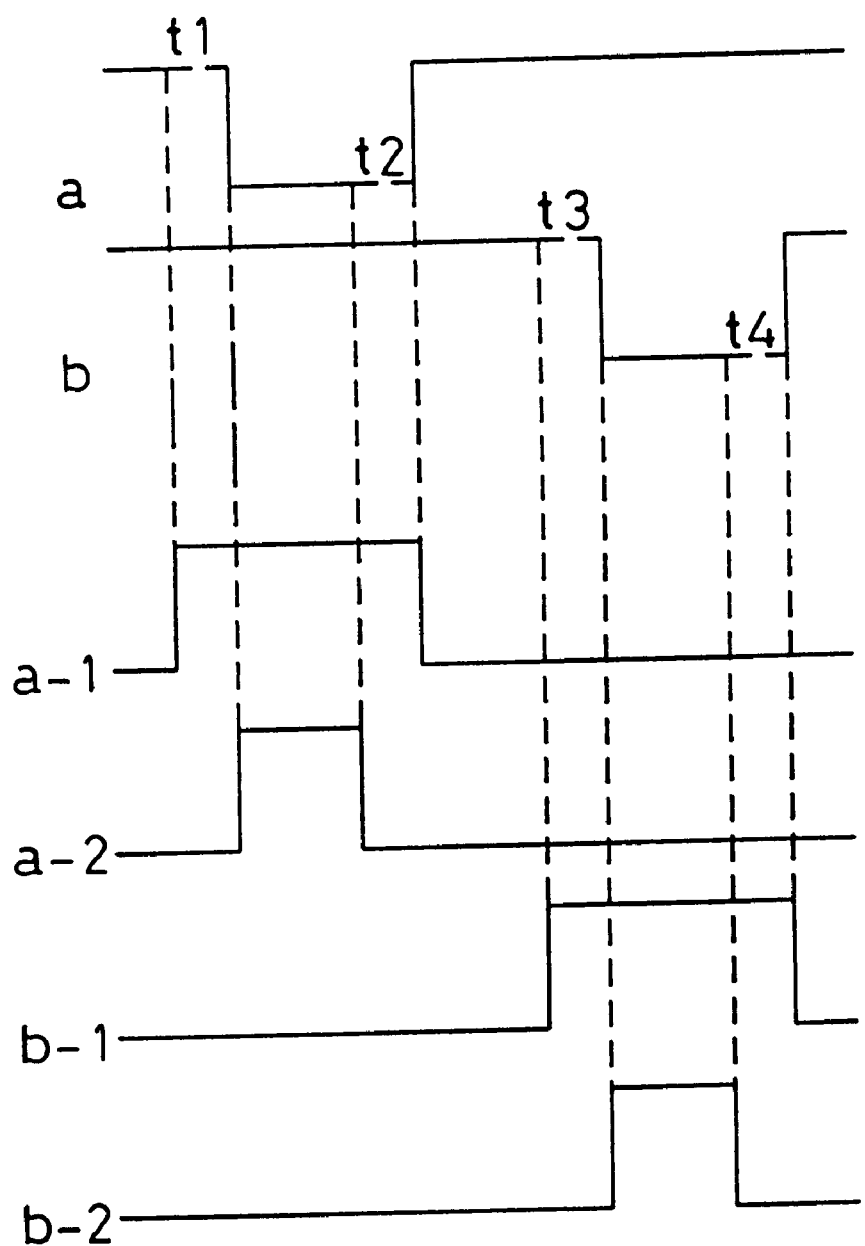
FIG. 8 is a timing chart showing the operation of the charge pump type booster circuit shown in FIG. 7.

A charge pump type booster circuit 101 for obtaining a negative booster voltage is provided with two charge pump type booster circuits 201 as shown in FIG. 7, unlike the charge pump circuits shown in FIG. 1. The circuit 101 is further provided with the equalizer 2, and the control circuit 3. Additionally, since the principle of boosting the ground potential in a negative direction is the same as that in the charge pump type booster circuit 201, a description thereof is omitted.

The operation of the charge pump type booster circuit 101 will next be described.

Figure 4:
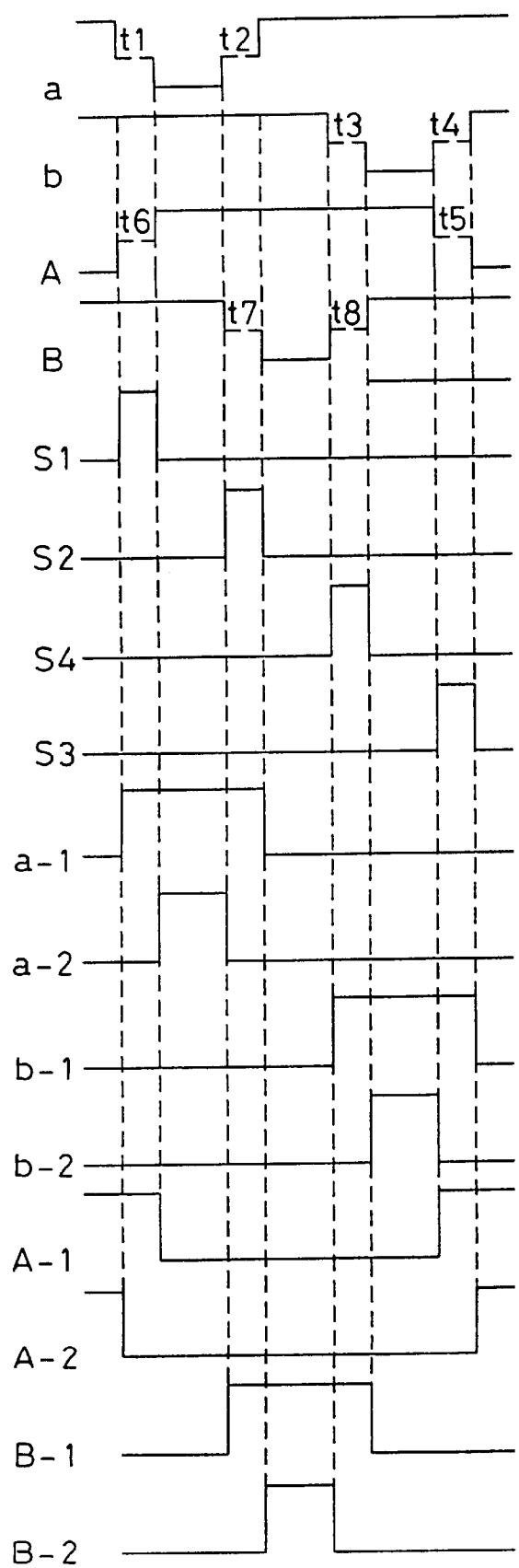
FIG. 4 is a timing chart showing an operation according to the second embodiment.

FIG. 4 is a timing chart showing the nodes 'a', 'b' and control signals a-1, a-2, b-1, b-2 in one cycle, and the corresponding nodes A, B and control signals A-1, A-2, B-1, B-2, and S1 to S4.

For the timing, each of the nodes A, B and control signals A-1, A-2, B-1, B-2 advances by 90° from each of the nodes 'a', 'b' and control signals a-1, a-2, b-1, b-2.

Therefore, when the control signal a-1 rises, the control signal A-2 falls. When the control signal a-2 rises, the control signal A-1 falls. When the control signal a-2 falls, the control signal B-1 rises. When the control signal a-1 falls, the control signal B-2 rises. When the control signal b-1 rises, the control signal B-2 falls. When the control signal b-2 rises, the control signal B-1 falls. When the control signal b-2 falls, the control signal A-1 rises. When the control signal b-1 falls, the control signal A-2 rises.

Additionally, the relationship of the time t1 to t8 and the control signals S1 to S4 is the same as in the first embodiment of FIG. 1.

Therefore, according to the charge pump type booster circuit 101 of the second embodiment, the sum of the charge/discharge currents of the capacitors connected to each charge pump series 23-1, 23-2 can be half of the sum in the conventional charge pump type booster circuit 201 (i.e. by the same action as in the charge pump type booster circuit 1 of the first embodiment). Therefore, according to the second embodiment, even when the number of stages n of each charge pump series 23-1, 23-2 is increased, the increase of charge/discharge currents of the capacitors C1 to Cn can be suppressed, and the power consumption can thus be reduced.

The present invention is not limited to the aforementioned embodiments, and can be modified as follows. Even in this case, the same action and effect can be obtained as in the embodiments described above.

(1) Although the embodiments are provided with two charge pump type booster circuits 21-1 and 21-2, one of ordinary skill in the art will appreciate that three or more charge pump type booster circuits of the same structure may be provided without departing from the spirit and scope of the invention.

(2) Also, one of ordinary skill in the art will appreciate that each of the capacitors C1 to Cn is not limited to a MOS capacitor. A capacitor formed by disposing a low-concentration impurity layer as a dielectric layer between two high-concentration impurity layers formed on a semiconductor substrate, a capacitor formed by disposing the dielectric layer between two electrodes, or another capacitor may be used.

(3) Each of the transistors TD2 to TDn has a function of increasing the boosting rate, and further enhancing the boosting efficiency when αxVDD is small. Therefore, the initial boosting rate is sufficiently fast. When αxVDD is sufficiently large, the transistors TD2 to TDn may be omitted. Moreover, when the transistors TD2 to TDm are used, but the other transistors TDm+1 to TDn are omitted, the initial boosting rate and boosting efficiency for the boosting operation can be adjusted by changing the number of remaining transistors TD2 to TDm.

(4) Although the diode-connected transistors T1 to Tn, TD1 to TDn act as diodes in the embodiments, the transistors T1 to Tn, TD1 to TDn may be replaced with PN junction diodes or the like.

(5) Also, although each of the transistors I1 to I4 is shown as being an NMOS transistor, one of ordinary skill in the art will appreciate that other switching elements, such as PMOS transistors or bipolar transistors may be used without departing from the spirit and scope of the invention.

(6) In the embodiments of the present invention, for the phase, the node 'a' deviates from the node A by °90, while the node 'b' deviates from the node B by 90°. The deviation of the phase is not limited to 90°, and another appropriate angle may be set.

(7) Finally, although the present invention has been shown as comprising discrete circuit components, one of ordinary skill in the art will appreciate that all or part of the present invention is preferable embodied as a CMOS ASIC or as a portion of a larger VLSI system. In addition, one of ordinary skill in the art will appreciate that if the present invention is included as part of an electronics application having a separate micro-controller or microprocessor, then the microprocessor may be used in place of the control circuit to control the timing of the present invention.

What is claimed is:

1. A charge pump type booster circuit comprising:

a charge pump series in which a capacitor and a switching element for transferring an electric charge of the capacitor to the next stage are connected in series in a plurality of stages, the charge pump series including a first capacitor group and a second capacitor group;

a first driver for applying a coupling to each capacitor of said first capacitor group;

a second driver for applying the coupling to each capacitor of said second capacitor group;

an equalizer for performing the capacitance coupling between said first capacitor group and said second capacitor group; and control circuit for controlling operations of said driver and said equalizer, wherein when said first capacitor group has a first electric potential, and said second capacitor group has a second electric potential lower than said first electric potential, said control circuit allows said equalizer to perform the capacitance coupling, charges said second capacitor group with a resulting discharge current of said first capacitor group, applies said coupling by said first driver, and applies said coupling by said second driver.

2. The charge pump type booster circuit according to claim 1, wherein said charge pump series is connected to a power supply, and said driver applies said coupling to move a positive electric charge to an output terminal of said charge pump series opposite to said power supply via said switching element, so that an electric potential of the output terminal of said charge pump series is raised above a power supply electric potential.

3. The charge pump type booster circuit according to claim 2, further comprising:

electric charge supply means for supplying a positive electric charge to each capacitor of said charge pump series.

4. The charge pump type booster circuit according to claim 1, wherein
   said charge pump series is connected to a power supply, and
   said driver applies said coupling to move a negative electric charge to an output terminal of said charge pump series opposite to said power supply via said switching element, so that an electric potential of the output terminal of said charge pump series is lowered below a ground electric potential.

5. The charge pump type booster circuit according to claim 4, further comprising:
   electric charge supply means for supplying a negative electric charge to each capacitor of said charge pump series.

6. The charge pump type booster circuit according to claim 1, wherein
   the application of said coupling by said first driver and the application of said coupling by said second driver are not performed simultaneously.

7. A charge pump type booster circuit comprising:
   a first charge pump series in which a capacitor and a switching element for transferring an electric charge of the capacitor to the next stage are connected in series in a plurality of stages;
   a second charge pump series in which the capacitor and the switching element for transferring the electric charge of the capacitor to the next stage are connected in series in a plurality of stages;
   a first driver for applying a coupling to each capacitor of said first charge pump series;
   a second driver for applying the coupling to each capacitor of said second charge pump series;
   an equalizer for performing the capacitance coupling between said first charge pump series and said second charge pump series; and
   control circuit for controlling operations of said driver and said equalizer, wherein
   when each capacitor of said first charge pump series has a first electric potential, and each capacitor of said second charge pump series has a second electric potential lower than said first electric potential, said control circuit allows said equalizer to perform the capacitance coupling, charges each capacitor of said second charge pump series with a resulting discharge current of each capacitor of said first charge pump series, applies said coupling by said first driver, and applies said coupling by said second driver.

8. The charge pump type booster circuit according to claim 7, wherein
   said charge pump series is connected to a power supply, and
   said driver applies said coupling to move a positive electric charge to an output terminal of said charge pump series opposite to said power supply via said switching element, so that an electric potential of the output terminal of said charge pump series is raised above a power supply electric potential.

9. The charge pump type booster circuit according to claim 8, further comprising:
   electric charge supply means for supplying a positive electric charge to each capacitor of said charge pump series.

10. The charge pump type booster circuit according to claim 7, wherein
    said charge pump series is connected to a power supply, and
    said driver applies said coupling to move a negative electric charge to an output terminal of said charge pump series opposite to said power supply via said switching element, so that an electric potential of the output terminal of said charge pump series is lowered below a ground electric potential.

11. The charge pump type booster circuit according to claim 10, further comprising:
    electric charge supply means for supplying a negative electric charge to each capacitor of said charge pump series.

12. The charge pump type booster circuit according to claim 7, wherein
    the application of said coupling by said first driver and the application of said coupling by said second driver are not performed simultaneously.

13. A charge pump type voltage booster circuit comprising:
    a first driver circuit electrically connected between a voltage supply and a reference potential and having a first driver output node ('a'), a second driver output node ('b'), and a plurality of control inputs;
    a first charge pump series electrically connected to the first and second driver output nodes and to one of the voltage supply and the reference potential, and having a voltage output node;
    a second driver circuit electrically connected between a voltage supply and a reference potential and having a third driver output node (A), a fourth driver output node (B), and a plurality of control inputs;
    a second charge pump series electrically connected to the third and fourth driver output nodes and to one of the voltage supply and the reference potential, and having a voltage output node;
    the voltage output node of the first charge pump series being electrically connected to the voltage output node of the second charge pump series for providing a boosted output voltage;
    an equalizer circuit selectively controllably interconnecting the driver output nodes of the first and second driver circuits, and having a plurality of equalizer control inputs; and
    a control circuit having a plurality of control lines each electrically connected to one of the equalizer control inputs, the first driver circuit control inputs, and the second driver circuit control inputs, and the control circuit, via the plurality of control circuit control lines, controlling the first driver circuit, the second driver circuit, and the equalizer according to a predetermined timing scheme such that the boosted voltage is provided at the voltage output nodes.

14. The charge pump type voltage booster circuit according to claim 13, wherein the equalizer circuit comprises a first switching element electrically interconnecting the first and third driver output nodes, a second switching element electrically interconnecting the first and fourth driver output nodes, a third switching element electrically interconnecting the second and third driver output nodes, and a fourth switching element electrically interconnecting the second and fourth driver output nodes, each of the switching elements being controllable by the control circuit in order to selectively controllably interconnect the driver output nodes.

15. The charge pump type voltage booster circuit according to claim 13, wherein the first charge pump series comprises at least one charge pump sub-circuit comprising:

a first capacitor having a first terminal and a second terminal, the first terminal being electrically connected to the second driver output node;

a second capacitor having a first terminal and a second terminal, the first terminal being electrically connected to the first driver output node;

a first diode having an anode terminal connected to the voltage supply and a cathode terminal connected to the second terminal of the first capacitor;

a second diode having an anode terminal electrically connected to the second terminal of the first capacitor and a cathode terminal connected to the second terminal of the second capacitor;

a third diode having an anode terminal electrically connected to the voltage supply and a cathode terminal electrically connected to the second terminal of the second capacitor; and a fourth diode having an anode terminal electrically connected to the second terminal of the second capacitor, a cathode terminal of the fourth diode providing either the voltage output node or a connection to the second terminal of the first capacitor of further charge pump sub-circuits.

16. The charge pump type voltage booster circuit according to claim 13, wherein the second charge pump series comprises at least one charge pump sub-circuit comprising:

a first capacitor having a first terminal and a second terminal, the first terminal being electrically connected to the fourth driver output node;

a second capacitor having a first terminal and a second terminal, the first terminal being electrically connected to the third driver output node;

a first diode having an anode terminal connected to the voltage supply and a cathode terminal connected to the second terminal of the first capacitor;

a second diode having an anode terminal electrically connected to the second terminal of the first capacitor and a cathode terminal connected to the second terminal of the second capacitor;

a third diode having an anode terminal electrically connected to the voltage supply and a cathode terminal electrically connected to the second terminal of the second capacitor; and a fourth diode having an anode terminal electrically connected to the second terminal of the second capacitor, a cathode terminal of the fourth diode providing either the voltage output node or a connection to the second terminal of the first capacitor of further charge pump sub-circuits.

17. The charge pump type voltage booster circuit according to claim 13, wherein the first charge pump series comprises at least one charge pump sub-circuit comprising:

a first capacitor having a first terminal and a second terminal, the first terminal being electrically connected to the second driver output node;

a second capacitor having a first terminal and a second terminal, the first terminal being electrically connected to the first driver output node;

a first diode having a cathode terminal connected to the reference potential and an anode terminal connected to the second terminal of the first capacitor;

a second diode having a cathode terminal electrically connected to the second terminal of the first capacitor and an anode terminal connected to the second terminal of the second capacitor;

a third diode having a cathode terminal electrically connected to the reference potential and an anode terminal electrically connected to the second terminal of the second capacitor; and a fourth diode having a cathode terminal electrically connected to the second terminal of the second capacitor, an anode terminal of the fourth diode providing either the voltage output node or a connection to the second terminal of the first capacitor of further charge pump sub-circuits.

18. The charge pump type voltage booster circuit according to claim 13, wherein the second charge pump series comprises at least one charge pump sub-circuit comprising:

a first capacitor having a first terminal and a second terminal, the first terminal being electrically connected to the fourth driver output node;

a second capacitor having a first terminal and a second terminal, the first terminal being electrically connected to the third driver output node;

a first diode having a cathode terminal connected to the reference potential and an anode terminal connected to the second terminal of the first capacitor;

a second diode having a cathode terminal electrically connected to the second terminal of the first capacitor and an anode terminal connected to the second terminal of the second capacitor;

a third diode having a cathode terminal electrically connected to the reference potential and an anode terminal electrically connected to the second terminal of the second capacitor; and a fourth diode having a cathode terminal electrically connected to the second terminal of the second capacitor, an anode terminal of the fourth diode providing either the voltage output node or a connection to the second terminal of the first capacitor of further charge pump sub-circuits.

19. A charge pump type booster circuit comprising:

a charge pump series including a first capacitor group and a second capacitor group, each capacitor group having at least one stage, each stage having at least one capacitor and at least one switching element for transferring an electric charge of the capacitor to a subsequent stage, the stages of the first capacitor group alternating with and electrically connected in series to the stages of the second capacitor group;

a first driver for applying a coupling to each capacitor of said first capacitor group;

a second driver for applying the coupling to each capacitor of said second capacitor group;

an equalizer for performing a capacitance coupling between said first capacitor group and said second capacitor group; and a control circuit for controlling operations of said driver and said equalizer, such that when said first capacitor group has a first electric potential, and said second capacitor group has a second electric potential lower than said first electric potential, said control circuit controls the equalizer to perform the capacitance coupling, the second capacitor group thereby being charged with a resulting discharge current of said first capacitor group, controls said first driver to apply said coupling, and controls said second driver to apply said coupling.

20. A charge pump type booster circuit comprising:

a first charge pump series having a plurality of stages electrically connected in series, each stage having at least one capacitor and at least one switching element for transferring an electric charge of the capacitors to a subsequent stage;

a second charge pump series having a plurality of stages electrically connected in series, each stage having at least one capacitor and at least one switching element for transferring an electric charge of the capacitors to a subsequent stage;

a first driver for applying a coupling to each capacitor of said first charge pump series;

a second driver for applying the coupling to each capacitor of said second charge pump series;

an equalizer for performing a capacitance coupling between said first charge pump series and said second charge pump series; and a control circuit for controlling operations of said driver and said equalizer, such that when each capacitor of said first charge pump series has a first electric potential, and each capacitor of said second charge pump series has a second electric potential lower than said first electric potential, said control circuit controls the equalizer to perform the capacitance coupling, the capacitors of said second charge pump series being charged with a resulting discharge current of the capacitors of said first charge pump series, controls said first driver to apply said coupling, and controls said second driver to apply said coupling.

* * * * *